US009406997B2

(12) United States Patent
Cho

(10) Patent No.: US 9,406,997 B2
(45) Date of Patent: Aug. 2, 2016

(54) NFC ANTENNA USING DUAL RESONANCE TECHNICAL FIELD

(71) Applicant: LG INNOTEK CO., LTD., Seoul (KR)

(72) Inventor: Young Bin Cho, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 37 days.

(21) Appl. No.: 14/286,579

(22) Filed: May 23, 2014

(65) Prior Publication Data

US 2014/0253396 A1   Sep. 11, 2014

Related U.S. Application Data

(63) Continuation of application No. 13/376,775, filed as application No. PCT/KR2010/003632 on Jun. 7, 2010, now Pat. No. 8,736,495.

(30) Foreign Application Priority Data

Jun. 10, 2009 (KR) .................. 10-2009-0051475

(51) Int. Cl.
  *H01Q 1/24* (2006.01)
  *H01Q 1/22* (2006.01)
  *H01Q 7/00* (2006.01)

(52) U.S. Cl.
  CPC ............ *H01Q 1/2208* (2013.01); *H01Q 1/243* (2013.01); *H01Q 7/00* (2013.01)

(58) Field of Classification Search
  CPC ........ H01Q 1/2208; H01Q 1/243; H01Q 7/00
  USPC ........................................ 343/702
  See application file for complete search history.

(56) References Cited

U.S. PATENT DOCUMENTS 7,202,825 B2 *  4/2007  Leizerovich ............ H01Q 1/44
                                              343/700 MS
7,212,124 B2 *  5/2007  Ohkawa ............ G06K 19/0723
                                              340/572.1
7,333,786 B2    2/2008  Kikuchi et al.
(Continued)

FOREIGN PATENT DOCUMENTS

CN        1604117 A     4/2005
EP        1439487 A2    7/2004
(Continued)

OTHER PUBLICATIONS

Office Action dated Mar. 3, 2015 in Japanese Application No. 2014-084919.
(Continued)

*Primary Examiner* — Hoang V Nguyen
(74) *Attorney, Agent, or Firm* — Saliwanchik, Lloyd & Eisenschenk

(57) ABSTRACT

The present invention is disclosed to provide an NFC antenna using dual resonance, wherein a closed circuit is formed by a capacitor and a loop antenna, and a relay unit is attached to a portable wireless terminal that forms a resonance to a predetermined frequency signal mutually transmitted between a portable wireless terminal reader and an NFC chip, and in the course of communicating between the NFC chip and the reader, the relay unit relays a signal transmitted by the reader to an NFC antenna unit, and the NFC chip relays a signal transmitted through the NFC antenna unit to the reader to thereby increase a recognition distance capable of obtaining predetermined information.

10 Claims, 7 Drawing Sheets

(56) References Cited

U.S. PATENT DOCUMENTS

| | | | |
|---|---|---|---|
| 7,388,547 B2 * | 6/2008 | Lee | H01Q 1/243 |
| | | | 343/700 MS |
| 8,208,980 B2 | 6/2012 | Wong et al. | |
| 8,364,203 B2 | 1/2013 | Morel et al. | |
| 8,406,686 B2 | 3/2013 | Tsushima et al. | |
| 8,736,495 B2 | 5/2014 | Cho | |
| 8,849,195 B2 | 9/2014 | Orihara et al. | |
| 8,897,843 B2 | 11/2014 | Wong et al. | |
| 8,954,122 B2 | 2/2015 | Wilmhoff et al. | |
| 8,957,813 B2 | 2/2015 | McCaughey et al. | |
| 9,172,134 B2 | 10/2015 | McCaughey et al. | |
| 9,247,681 B2 | 1/2016 | Patino | |
| 9,264,090 B2 | 2/2016 | Johnson et al. | |
| 2004/0041025 A1 | 3/2004 | Fukushima et al. | |
| 2004/0140896 A1 | 7/2004 | Ohkawa et al. | |
| 2005/0079820 A1 | 4/2005 | Yamashita | |
| 2005/0125093 A1 | 6/2005 | Kikuchi et al. | |
| 2006/0263647 A1 | 11/2006 | Moon et al. | |
| 2007/0155443 A1 * | 7/2007 | Cheon | H04B 1/3805 |
| | | | 455/572 |
| 2008/0297419 A1 | 12/2008 | Dou et al. | |
| 2009/0017882 A1 | 1/2009 | Kushima | |
| 2009/0160619 A1 | 6/2009 | Kato et al. | |
| 2010/0113111 A1 | 5/2010 | Wong et al. | |
| 2011/0163457 A1 | 7/2011 | Mohan et al. | |

FOREIGN PATENT DOCUMENTS

| | | |
|---|---|---|
| JP | 3044966 U | 10/1997 |
| JP | 2000-137779 A | 5/2000 |
| JP | 2003-187195 A | 7/2003 |
| JP | 2003-249814 A | 9/2003 |
| JP | 2004-029873 A | 1/2004 |
| JP | 2004-343410 A | 12/2004 |
| JP | 2005-117354 A | 4/2005 |
| JP | 2006-157603 A | 6/2006 |
| JP | 2008-072243 A | 3/2008 |
| JP | 2008-537310 A | 9/2008 |
| JP | 2008-251283 A | 10/2008 |
| JP | 2008-306689 A | 12/2008 |
| KR | 10-2000-0063118 A | 11/2000 |
| KR | 10-2002-0064451 A | 8/2002 |
| KR | 10-0682539 B1 | 2/2007 |
| WO | WO-2008/050535 A1 | 5/2008 |
| WO | WO-2013/165421 A1 | 11/2013 |

OTHER PUBLICATIONS

European Search Report dated May 22, 2014 in European Application No. 10786332.6.

Decision of Grant dated Jun. 28, 2011 in Korean Application No. 10-2009-0051475, filed Jun. 10, 2009.

Office Action dated Dec. 30, 2013 in Chinese Application No. 201080025421.

Office Action dated Jul. 2, 2013 in Japanese Application No. 2012-514879, filed Jun. 7, 2010.

Office Action dated Mar. 11, 2016 in U.S. Appl. No. 14/698,446.

European Search Report filed Sep. 23, 2015 in European Application No. 15165428.2.

* cited by examiner

NFC ANTENNA USING DUAL RESONANCE
TECHNICAL FIELD

CROSS-REFERENCE TO RELATED APPLICATIONS

This application is a continuation of U.S. application Ser. No. 13/376,775, filed Dec. 7, 2011, which is the U.S. national stage application of International Patent Application No. PCT/KR2010/003632, filed Jun. 7, 2010, which claims priority to Korean Application No. 10-2009-0051475, filed Jun. 10, 2009, the disclosures of each of which are incorporated herein by reference in their entirety.

TECHNICAL FIELD

The present invention relates to an NFC (Near Field Antenna) using dual resonance.

BACKGROUND ART

In general, an RFID (Radio Frequency Identification) concerns to one of the automatic recognition fields using radio waves. The RFID is also called a radio frequency recognition system configured to recognize pre-stored predetermined information wirelessly using radio waves such as ultra short waves or long waves.

Principle of the RFID system is to recognize information recorded in a tag via a wireless communication. The recorded information belongs to RFID fields for example a bar code label, a magnetic stripe, etc. An RFID reader receives information stored in the tag via an antenna. The RFID reader recognizes and analyzes the received information, and obtains inherent and circumstance information for a product where the tag is applied or, incorporated.

The RFID system uses signals to be free from ambient environment such as snow, rain, dust and magnetic flux, for example. Furthermore, the recognition speed is fast such that recognition is possible even in transit, and at a predetermined long distance. The RFID system is provided with an intrinsic ID (identification) in the manufacturing process to substantially prevent itself from being fabricated or counterfeited.

The RFID system includes for example a reader, an antenna, a tag, etc. The antenna performs an intermediation function between the tag and the reader. A power and a signal are sent to the tag via the antenna via a wireless communication, so that the tag is activated. Further, a response from the tag is received via the antenna. Meanwhile, the RFID system uses a NFC (Near Field Communication) scheme and a mobile RFID (mRFID) scheme. In other words, the NFC is a short-range high frequency wireless communication technology which enables the exchange of data between devices over about a short distance. The RFID system of the NFC scheme, for example, uses a frequency (e.g., 13.56 MHz) of a high frequency band with low power to transmit data at a distance between 10 cm and 60 cm. Since the NFC scheme provides high security, the NFC scheme has been used in applications for example a traffic card, mobile payment, etc. The NFC scheme is standardized in ISO/IEC 18092.

The NFC scheme can perform a short distance radio communication using various frequency signals including 125, 135 and 900 kHz in addition to the 13.56 MHz.

An NFC device has such advantages of communicating or being compatible with existing information devices including portable wireless terminals and notebook computers through exchanges of address books, game and MP3 files. The NFC technology using a predetermined frequency band is high in its safety and already in use for public transportation and mobile phone payment. The NFC technology may be utilized as a future information terminal capable of obtaining various information by approaching a tag stored with predetermined information.

A mobile phone embedded with NFC chips is in an early distribution stage and the NFC technology is expected to be widely adopted in mobile terminals including portable wireless terminals.

The portable terminals embedded with NFC chips are generally mounted with an antenna through which to communicate with an external reader. However, the NFC antenna mounted on the portable wireless terminal cannot communicate with the reader unless mutually close such that increase of recognition distance with the NFC antenna is required.

DISCLOSURE

Technical Problem

The present invention is disclosed to obviate the above-mentioned problems, and it is an object of the present invention to provide an NFC antenna using dual resonance capable of increasing a recognition distance of the NFC antenna.

It should be emphasized that the present invention should not be construed as limited to particular embodiments, but the particular embodiments disclosed herein are illustrative only. Other technical teachings that are not referred to herein may be clearly appreciated by skilled in the art from the following description.

Technical Solution

According to the NFC antenna using a dual resonance, a closed circuit is formed by a capacitor and a loop antenna, and a relay unit is attached to a portable wireless terminal that forms a resonance to a predetermined frequency signal mutually transmitted between a portable wireless terminal reader and an NFC chip.

In the course of communicating between the NFC chip and the reader, the relay unit serves to relay a signal transmitted by the reader to an NFC antenna unit. The NFC chip serves to relay a signal transmitted through the NFC antenna unit to the reader to increase a recognition distance.

According to a general aspect of the present invention, an NFC antenna using a dual resonance is characterized by: an NFC antenna unit embedded in a portable wireless terminal, transmitting a signal transmitted by an external reader by communicating with the reader to an NFC chip and transmitting a signal provided by an NFC chip to the reader; and a relay unit embedded in the portable wireless terminal, relaying a signal transmitted by an external reader to the NFC antenna and relaying a signal transmitted through the NFC antenna to the reader.

In some exemplary embodiments of the present invention, the NFC antenna may include a loop antenna connected to a transmission/reception terminal of the NFC chip by forming a dual resonance with a capacitor.

In some exemplary embodiments of the present invention, the loop antenna may be attached to a substrate inside the portable wireless terminal, and the relay unit is attached to an inner surface of a case of the portable wireless terminal.

In some exemplary embodiments of the present invention, the loop antenna may be attached to a substrate inside the portable wireless terminal, and the relay unit is attached to an outer surface of a case of the portable wireless terminal.

In some exemplary embodiments of the present invention, the loop antenna may be formed at a PCM (Protect Circuit Module) inside a battery pack attachable to and detachable from the portable wireless terminal, and the relay unit is integrally molded by being attached to an inside the battery pack.

In some exemplary embodiments of the present invention, the loop antenna may be an SMT (Surface Mount Technology) type in which loop antenna patterns are formed at a plurality of sheets, and the plurality of sheets formed with the loop antenna pattern is stacked and the loop antenna patterns are mutually connected through a via hole.

In some exemplary embodiments of the present invention, the relay unit may be formed by a closed circuit providing a resonance created by the loop antenna and the capacitor to relay a transmission signal of the reader and the NFC antenna unit.

In some exemplary embodiments of the present invention, the relay unit may be such that the loop antenna patterns are formed on an upper surface of a film, and a capacitor is interconnected across the loop antenna patterns of the relay unit.

In some exemplary embodiments of the present invention, the capacitor may be such that a distal end and the other distal end of the capacitor are oppositely printed on the upper surface and a rear surface of the film, and a distal end pattern and the other distal end pattern are electrically connected across the loop antenna patterns of the relay unit.

In some exemplary embodiments of the present invention, the capacitor may be connected across the loop antenna patterns of the relay unit using individual elements.

In some exemplary embodiments of the present invention, the NFC antenna using dual resonance may include a ferrite seat attached to the relay unit.

Advantageous Effects

An NFC antenna using dual resonance according to the present invention is such that a closed circuit is formed by a capacitor and a loop antenna, and a relay unit is attached to a portable wireless terminal that forms a resonance to a predetermined frequency signal mutually transmitted between a portable wireless terminal reader and an NFC chip, and in the course of communicating between the NFC chip and the reader, the relay unit relays a signal transmitted by the reader to an NFC antenna unit, and the NFC chip relays a signal transmitted through the NFC antenna unit to the reader to thereby increase a recognition distance capable of obtaining predetermined information.

DESCRIPTION OF DRAWINGS

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

MODE FOR INVENTION

Hereinafter, exemplary embodiments of the present invention are described in detail with reference to the accompanying drawings. Detailed descriptions of well-known functions, configurations or constructions are omitted for brevity and clarity so as not to obscure the description of the present invention with unnecessary detail.

The particular embodiments disclosed herein are illustrative only, as the invention may be modified and practiced in different but equivalent manners apparent to those skilled in the art having the benefit of the teachings herein. The present invention may, however, be embodied in many different forms and should not be construed as limited to the embodiments set forth herein. Rather, these embodiments are provided so that this disclosure will be thorough and complete, and will fully convey the scope and principle of the general inventive concept to those skilled in the art.

Figure 1:
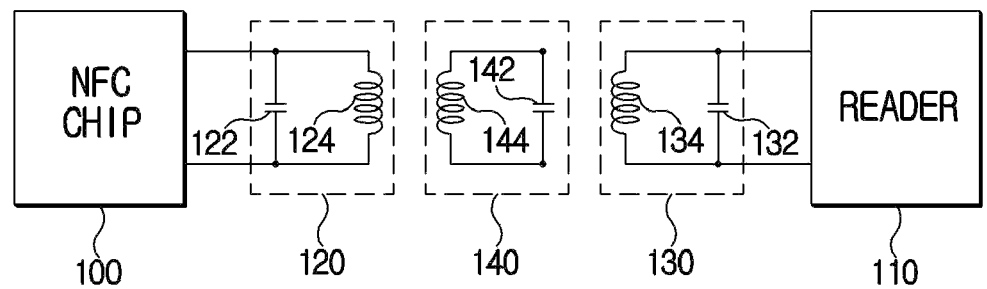
FIG. 1 is a block diagram illustrating an operation principle of an NFC antenna according to the present invention.

FIG. 1 is a block diagram illustrating an operation principle of an NFC antenna according to the present invention, where reference numeral 100 is an NFC (Near Field Communication) chip. For example, the NFC chip is embedded in various portable terminals such as mobile terminals.

Reference numeral 110 is a reader. The NFC chip (100) and the reader (110) perform mutual communication, where the reader (110) obtains a predetermined information stored in the NFC chip (100) and processes the obtained information.

The NFC chip (100) is pre-stored with predetermined information including user information capable of identifying a user using a portable terminal. The reader (110) obtains and processes the predetermined information stored in the NFC chip (100).

Reference numeral (120) is an NFC antenna unit. The NFC antenna unit (120) is such that a capacitor (122) and a loop antenna (124) are connected to the transmission/reception terminal of the NFC chip (100) to form a parallel resonance.

The NFC antenna unit (120) forming the parallel resonance operates in such a manner that the loop antenna (124) receives a signal of a predetermined frequency transmitted by the external reader (110) and transmits the signal to the NFC chip (100). Furthermore, the NFC antenna unit (120) transmits to the reader (110) a signal of a predetermined frequency provided by the NFC chip (100).

Reference numeral 130 is a reader antenna unit. The reader antenna unit (130) such that a capacitor (132) and a loop antenna (134) are connected to the transmission/reception terminal of the reader (110) to form a parallel resonance. The loop antenna (134) transmits a signal of predetermined frequency provided by the reader (110) to the outside. Furthermore, the loop antenna (134) receives a signal of predetermined frequency transmitted by the NFC chip (100) through the loop antenna (124) and outputs to the reader (110).

Reference numeral 140 is a relay unit. The relay unit (140) is formed in a closed circuit by a capacitor (142) and a loop antenna (144). The relay unit (140) is attached to a portable terminal embedded with the NFC chip (100) and functions to relay a signal of predetermined frequency transmitted by the NFC antenna unit (120) and the reader antenna (130) therebetween.

The present invention thus configured operates in such a manner that the reader (110) periodically outputs a signal of predetermined frequency to the transmission/reception terminal.

The signal of predetermined frequency outputted by the reader (110) is applied to the capacitor (132) and the loop antenna (134) of the reader antenna (130). The capacitor (132) and the loop antenna (134) are parallel-resonated to a signal of predetermined frequency outputted by the reader (110) to allow a resonant current to flow to the loop antenna (134), where a magnetic field formed by the resonant current is produced from the loop antenna (134).

Under this state, in a case a user proximity-touches (approaches) a portable terminal to the reader (110), the magnetic field created by the loop antenna (134) is induced to the loop antenna (144) of the relay unit (140), whereby, the capacitor (142) and the loop antenna (144) are resonated to cause the loop antenna (144) to generate a magnetic field.

The magnetic field generated by the loop antenna (144) of the relay unit (140) is induced to the loop antenna (124) of the NFC antenna unit (120) to cause parallel resonance to be generated between the capacitor (122) and the loop antenna (124), whereby a resonance current is made to flow. A signal of the resonance current flowing to the capacitor (122) and the loop antenna (124) is inputted to the transmission/reception terminal of the NFC chip (100).

In a case the signal of the resonance current is inputted to the NFC chip (100), the NFC chip (100) outputs predetermined information pre-stored in the NFC chip (100) to the transmission/reception terminal. For example, the NFC chip (100) may output the predetermined information including the user information of the portable terminal in a signal of a predetermined frequency.

The output signal of the NFC chip (100) is supplied to the capacitor (122) and the loop antenna (124) of the NFC antenna unit (120), where a resonance current flows to the capacitor (122) and the loop antenna (124) to cause the loop antenna (124) to generate a magnetic field.

The magnetic field generated by the loop antenna (124) is induced to the loop antenna (144) of the relay unit (140) to allow the capacitor (142) and the loop antenna (144) to resonate, where the magnetic field flows to the loop antenna (144).

The magnetic field flowing to the loop antenna (144) is transmitted to the loop antenna (134) of the reader antenna unit (130), whereby a resonance current flows to the capacitor (132) and the loop antenna (134). The signal of the resonance current is inputted to the reader (110), where the reader (110) identifies and processes the predetermined information stored in the NFC chip (100).

The present invention is such that the relay unit (140) is mounted on the portable terminal. In a case the portable terminal is proximity-touched to (approaches) the reader (110), the relay unit (140) relays a signal that is transmitted between the reader antenna unit (130) and the NFC antenna unit (120), such that the reader (110) can increase the recognition distance of the NFC chip (100).

Figure 2:
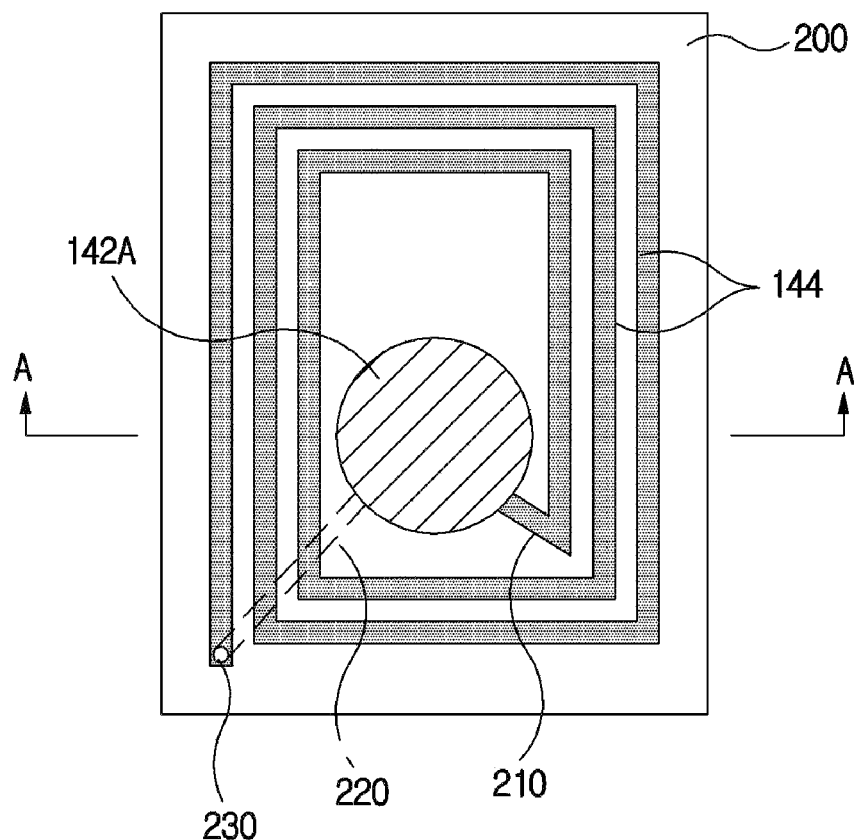
FIG. 2 is a plan view illustrating an exemplary configuration of a magnetic relay unit in an NFC antenna according to the present invention.
Figure 3:
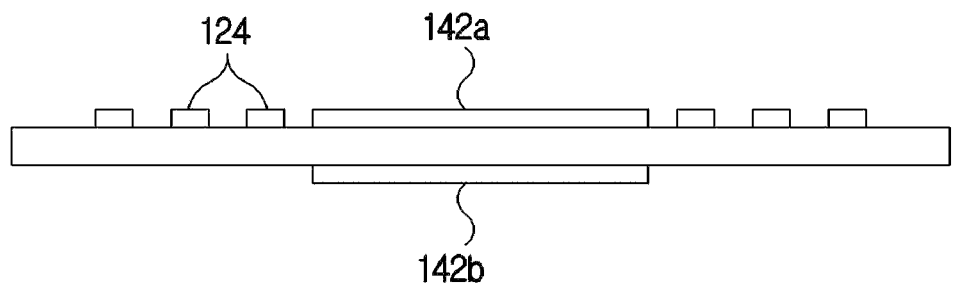
FIG. 3 is a cross-sectional view taken along line A-A of FIG. 2.

FIG. 2 is a plan view illustrating an exemplary configuration of a magnetic relay unit in an NFC antenna according to the present invention, and FIG. 3 is a cross-sectional view taken along line A-A of FIG. 2, where reference numeral 200 is a film. For example, the film (200) may a PET (Poly Ethylene Terephthalate) film.

The film (200) is printed with a pattern of the loop antenna (144) in conductive ink. An upper surface and a rear surface of the film (200) are respectively printed with a pattern of a distal end terminal (142a) of the capacitor (142) and printed with a pattern of the other distal end terminal (142b) of the capacitor (142), each pattern facing the other pattern. The pattern of a distal end terminal (142a) of the capacitor (142) is electrically connected to a distal end of the pattern of the loop antenna (144), referred to as loop antenna pattern) through a pattern extension (210). The pattern of the other distal end terminal (142b) may be connected to the other distal end of the pattern of the loop antenna (144) through the pattern extension (220) and the via hole (230).

Figure 4:
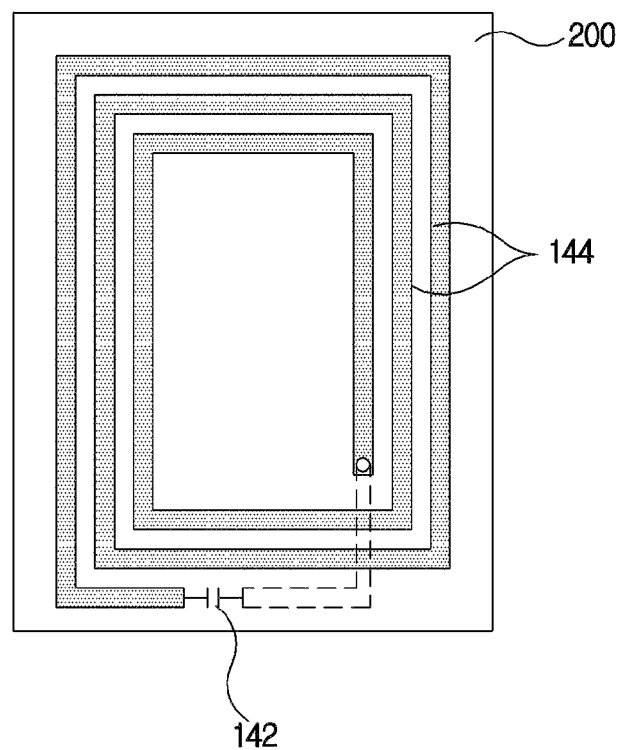
FIG. 4 is a plan view illustrating another exemplary configuration of a magnetic relay unit in an NFC antenna according to the present invention.

FIG. 4 is a plan view illustrating another exemplary configuration of a magnetic relay unit in an NFC antenna according to the present invention.

Referring to FIG. 4, in the another exemplary embodiment of the present invention, the capacitor (142) may not be formed on the film (200) as a pattern, but may be connected across the pattern of the loop antenna (144) using an individual element.

The relay unit (140) thus configured may be glued to the portable terminal using adhesive, for example.

Figure 5:
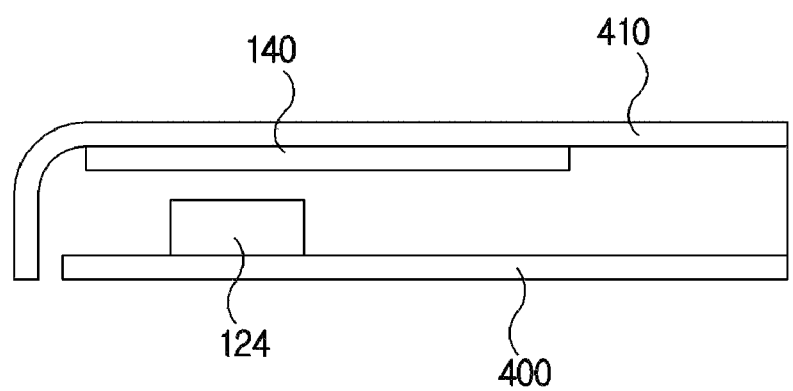
FIG. 5 is a cross-sectional view illustrating a configuration in which an NFC antenna is mounted at a wireless portable terminal according to an exemplary embodiment of the present invention.

FIG. 5 is a cross-sectional view illustrating a configuration in which an NFC antenna is mounted at a wireless portable terminal according to an exemplary embodiment of the present invention, where reference numeral 400 is a substrate embedded in the portable terminal. The substrate (400) is mounted with the NFC chip (100) by way of conventional method, and concurrently mounted with the capacitor (122) and the loop antenna (124) of NFC antenna unit (120).

The loop antenna (124) forms an antenna pattern having a predetermined length on a plurality of sheets, and the loop antenna is an SMT (Surface Mount Technology) type in which loop antenna patterns are formed with a plurality of sheets, and the plurality of sheets formed with the loop antenna pattern is stacked and the loop antenna patterns are mutually connected through a via hole.

Reference numeral 410 is a case of a portable terminal. For example, the case may be a rear case of the portable terminal, an inner surface of the case (410) may be glued with the film (200) formed with the relay unit (140) using a glue or the like.

Figure 6:
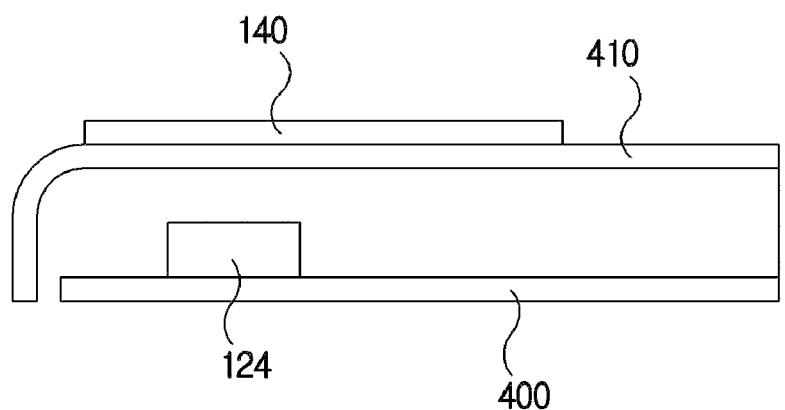
FIG. 6 is a cross-sectional view illustrating a configuration in which an NFC antenna is mounted at a wireless portable terminal according to another exemplary embodiment of the present invention.

FIG. 6 is a cross-sectional view illustrating a configuration in which an NFC antenna is mounted at a wireless portable terminal according to another exemplary embodiment of the present invention.

Referring to FIG. 6, the film (200) formed with the relay unit (140) may be glued to an external surface of the case (400) using a glue or the like.

Figure 7:
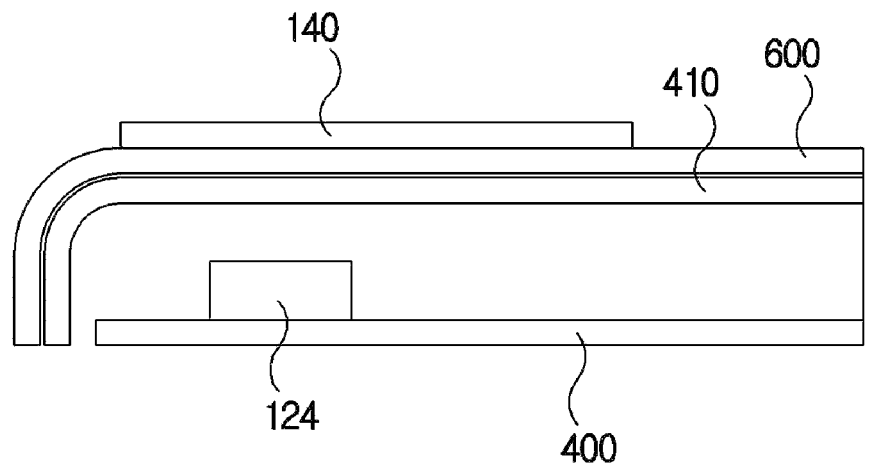
FIG. 7 is a cross-sectional view illustrating a configuration in which an NFC antenna is mounted at a wireless portable terminal according to still another exemplary embodiment of the present invention.

FIG. 7 is a cross-sectional view illustrating a configuration in which an NFC antenna is mounted at a wireless portable terminal according to still another exemplary embodiment of the present invention.

Referring to FIG. 7, an inner surface of a protection case (600) for wireless portable terminal may be glued with the film (200) formed with the relay unit (140) using a glue or the like.

That is, the wireless portable terminal is conventionally attached with the protection case (600) by the user to protect the case (400) against any scratches or the like. Under this circumstance, the user may attach the film (200) formed with the relay unit (140) to an inner surface of the protection case (600) of the wireless portable terminal using the glue.

Although not illustrated in the figures, the film (200) formed with the relay unit (140) may be glued to an external surface of the protection case (600) using a glue or the like.

Figure 8:
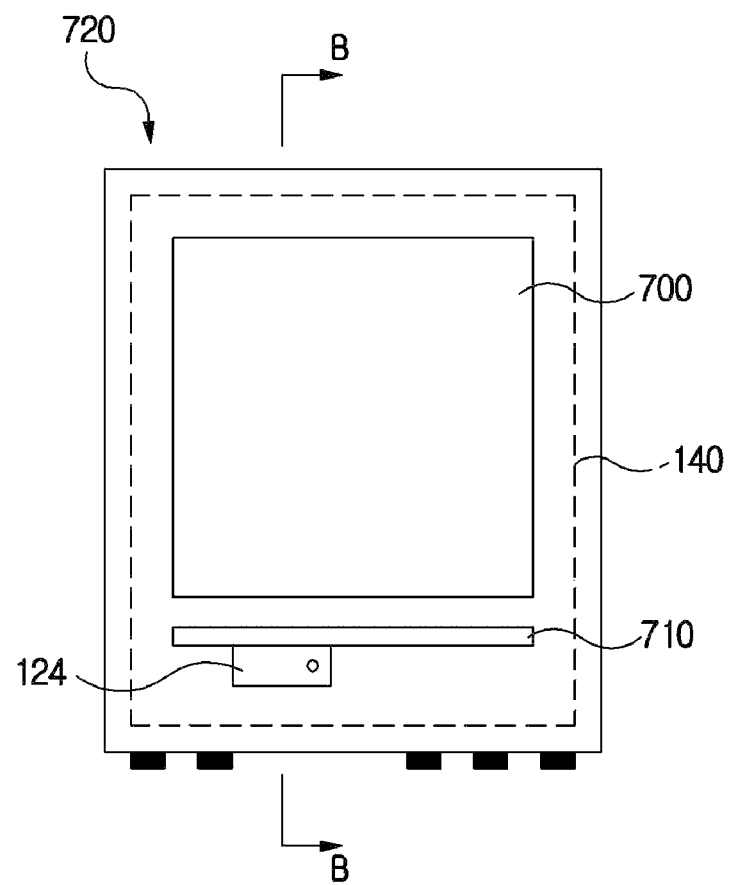
FIG. 8 is a cross-sectional view illustrating a configuration in which an NFC antenna is mounted at a battery pack of a wireless portable terminal according to still further exemplary embodiment of the present invention.
Figure 9:
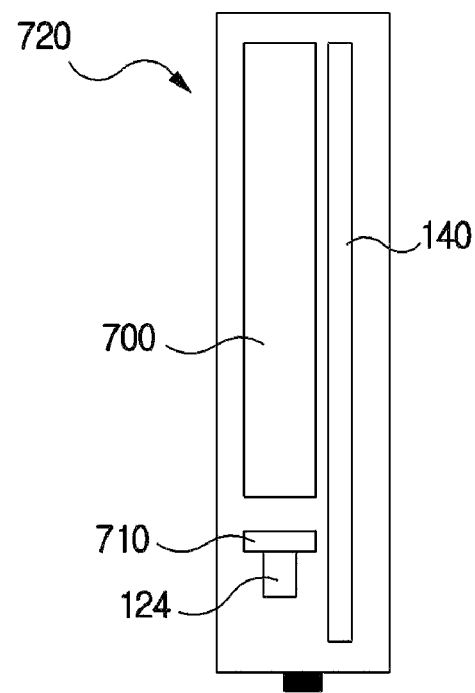
FIG. 9 is an enlarged cross-sectional view taken along line B-B of FIG. 8.
Figure 10:
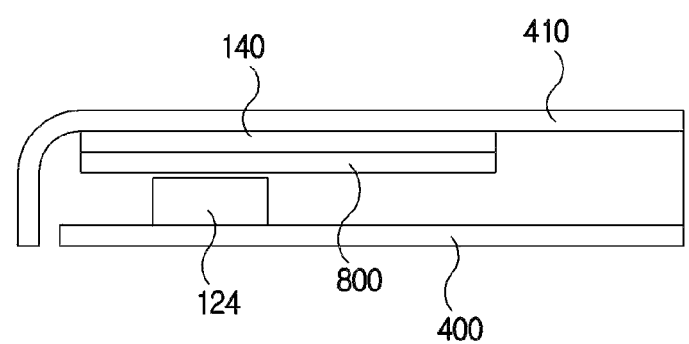
FIGS. 10 through 13 are schematic views illustrating configurations in which a ferrite sheet is formed at a magnetic field relay unit of an NFC antenna according to still further exemplary embodiments of the present invention.
Figure 11:
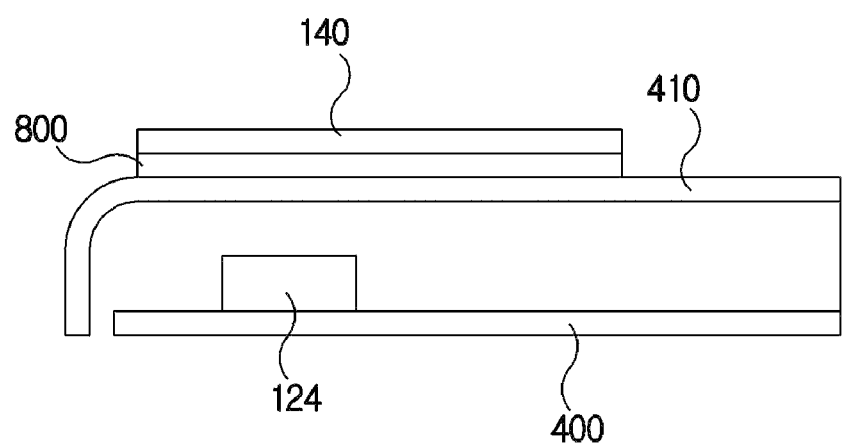
Figure 12:
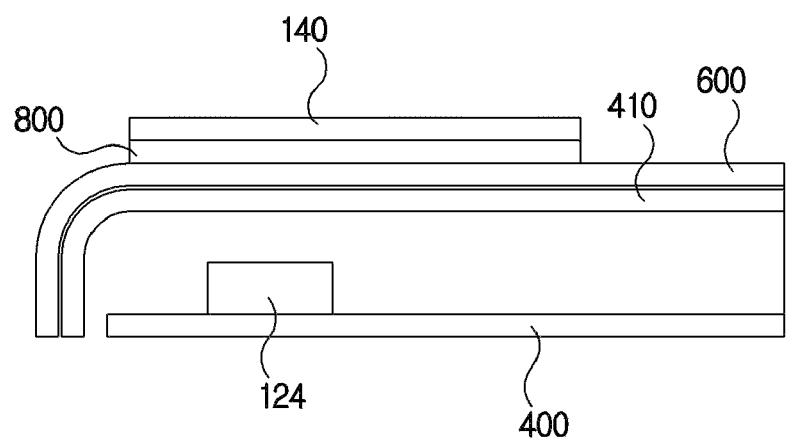
Figure 13:
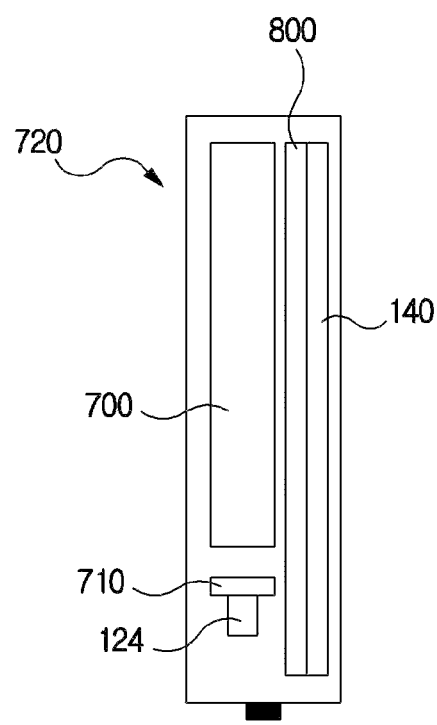

FIG. 8 is a cross-sectional view illustrating a configuration in which an NFC antenna is mounted at a battery pack of a wireless portable terminal according to still further exemplary embodiment of the present invention, and FIG. 9 is an enlarged cross-sectional view taken along line B-B of FIG. 8, where reference numeral 700 is a battery and 710 is a PCM (Protect Circuit Module) for protecting the battery (700).

For example, the battery (700) may be lithium ion battery, where the PCM (710) removes the risk of explosion, protects against the over-charge and over-discharge, interrupts the short-circuit and prevents inflow of over-current.

In a battery pack (720) formed with the batteries (700), the PCM (710) is mounted with the SMT type loop antenna (124) of NFC antenna unit (120), and the battery (700) and an upper surface of the PCM (710) are positioned with the relay unit (140) to be integrally molded to form the battery pack (720).

FIGS. 10 through 13 are schematic views illustrating configurations in which a ferrite sheet is formed at a magnetic field relay unit of an NFC antenna according to still further exemplary embodiments of the present invention.

Referring to FIGS. 10 through 13, a separate ferrite sheet (800) may be attached to the relay unit (140) to increase the intensity of magnetic field generated by the loop antenna (144) of the relay unit (140), whereby the reader (110) can increase the recognition distance of the NFC chip (100).

While the present invention has been particularly shown and described with reference to exemplary embodiments thereof, the general inventive concept is not limited to the above-described embodiments. It will be understood by those of ordinary skill in the art that various changes and variations in form and details may be made therein without departing from the spirit and scope of the present invention as defined by the following claims.

The invention claimed is:

1. A case configured to be attachable to and detachable from a portable wireless terminal, the case having an inner surface and an outer surface and comprising a relay unit attached to the inner surface or the outer surface of the case,
wherein the relay unit comprises a closed circuit with a loop antenna configured to provide a resonance to relay transmission signals of an external reader and an attached NFC antenna unit on an inner substrate of the portable wireless terminal.

2. The case according to claim 1, wherein the loop antenna is formed at a PCM (Protect Circuit Module) inside a battery pack, and the relay unit is integrally formed with the battery pack.

3. The case according to claim 1, wherein the loop antenna is an SMT (Surface Mount Technology) type in which loop antenna patterns are formed at a plurality of sheets.

4. The case according to claim 3, wherein the plurality of sheets formed with the loop antenna patterns are stacked, and wherein the loop antenna patterns are electrically connected to each other through a via hole.

5. The case according to claim 1, wherein the relay unit further comprises a capacitor and a film, wherein the loop antenna comprises a loop antenna pattern on an upper surface of the film, and wherein the capacitor is connected across the loop antenna pattern.

6. The case according to claim 5, wherein a first distal end and a second distal end of the capacitor are oppositely printed on the upper surface and a rear surface of the film, respectively, and wherein the first distal end of the capacitor and the second distal end of the capacitor are electrically connected across the loop antenna pattern.

7. The case according to claim 5, wherein the film is glued to the inner surface or the outer surface of the case.

8. The case according to claim 1, further comprising a ferrite sheet attached to the relay unit.

9. The case according to claim 1, wherein the relay unit is attached to the inner surface of the case and the outer surface of the case.

10. The case according to claim 1, wherein the relay unit further comprises a capacitor configured to provide a resonance to relay transmission signals of an external reader and an NFC antenna unit.

\* \* \* \* \*